US010771236B2

(12) United States Patent
Courtney

(10) Patent No.: US 10,771,236 B2
(45) Date of Patent: Sep. 8, 2020

(54) DEFENDING AGAINST A SIDE-CHANNEL INFORMATION ATTACK IN A DATA STORAGE DEVICE

(71) Applicant: Seagate Technology, LLC, Cupertino, CA (US)

(72) Inventor: Timothy J. Courtney, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 376 days.

(21) Appl. No.: 15/585,586

(22) Filed: May 3, 2017

(65) Prior Publication Data
US 2018/0323958 A1   Nov. 8, 2018

(51) Int. Cl.
| G06F 11/30 | (2006.01) |
| G06F 12/14 | (2006.01) |
| H04L 9/00 | (2006.01) |
| G06F 21/60 | (2013.01) |
| G06F 7/58 | (2006.01) |
| G06F 21/75 | (2013.01) |
| H04L 9/06 | (2006.01) |

(52) U.S. Cl.
CPC .............. *H04L 9/003* (2013.01); *G06F 7/58* (2013.01); *G06F 21/602* (2013.01); *G06F 21/755* (2017.08); *H04L 9/0662* (2013.01)

(58) Field of Classification Search
CPC ............................................. H04L 9/002–005
See application file for complete search history.

(56) References Cited

U.S. PATENT DOCUMENTS

| 5,231,636 | A | 7/1993 | Rasmussen |
| 5,562,214 | A * | 10/1996 | Castaneda ............. B07C 5/3425 |
| | | | 209/564 |
| 6,654,884 | B2 | 11/2003 | Jaffe et al. |
| 6,748,535 | B1 | 6/2004 | Ryan, Jr. et al. |
| 6,807,232 | B2 | 10/2004 | Nicholson et al. |
| 7,417,468 | B2 | 8/2008 | Verbauwhede et al. |
| 7,426,629 | B2 | 9/2008 | Piry et al. |

(Continued)

OTHER PUBLICATIONS

Xavier Charvet and Herve Pelletier, Improving the DPA Attack Using Wavelet Transform, pp. 1-15,2005.

*Primary Examiner* — Trong H Nguyen
(74) *Attorney, Agent, or Firm* — Hall Estill Attorneys at Law

(57) ABSTRACT

Apparatus and method for enacting data security in a data storage device, such as by protecting against a differential power analysis (DPA) attack. In some embodiments, a programmable processor executes programming in a memory to perform a cryptographic function upon user data associated with a host command received from a host device. The cryptographic function involves multiple logical computations to arrive at an output value responsive to an input value over a time interval. During the time interval, the programmable processor is repetitively interrupted by a plurality of interrupt calls respectively selected responsive to a first series of random numbers and resumes operation by a corresponding plurality of function return calls respectively selected responsive to a second series of random numbers. Each of the interrupt calls causes the programmable processor to temporarily suspend the multiple logical computations and perform at least one non-cryptographic function.

20 Claims, 5 Drawing Sheets

(56) References Cited

U.S. PATENT DOCUMENTS

| | | |
|---|---|---|
| 7,599,488 B2 | 10/2009 | Kocher et al. |
| 7,639,058 B2 | 12/2009 | Kuroawa et al. |
| 7,870,336 B2 | 1/2011 | Erlingsson et al. |
| 8,334,705 B1 | 12/2012 | Gunnam et al. |
| 8,427,194 B2 | 4/2013 | Deas et al. |
| 8,635,467 B2 | 1/2014 | Gunnam et al. |
| 8,879,724 B2 | 11/2014 | Kocher et al. |
| 9,250,671 B2 | 2/2016 | Tucker |
| 9,343,162 B2 | 5/2016 | Tasher et al. |
| 9,436,603 B1 | 9/2016 | Pohlack |
| 2001/0016910 A1* | 8/2001 | Tanimoto .............. G06F 9/3879 713/172 |
| 2002/0166058 A1* | 11/2002 | Fueki ..................... G06F 21/85 713/194 |
| 2004/0260932 A1* | 12/2004 | Blangy ................... G06F 21/75 713/189 |
| 2008/0065905 A1* | 3/2008 | Salessi .................... G06F 21/31 713/193 |
| 2010/0067685 A1* | 3/2010 | Okita ...................... H04L 9/003 380/28 |
| 2011/0260749 A1 | 10/2011 | Deas et al. |
| 2012/0204056 A1 | 8/2012 | Airaud et al. |
| 2013/0007881 A1 | 1/2013 | Liem et al. |
| 2015/0082434 A1 | 3/2015 | Sethumadhavan et al. |
| 2015/0333903 A1* | 11/2015 | Stocker .................. H04L 9/003 726/22 |
| 2015/0365228 A1 | 12/2015 | Belenky |
| 2017/0141912 A1* | 5/2017 | Cech ...................... H04L 9/003 |

\* cited by examiner

DEFENDING AGAINST A SIDE-CHANNEL INFORMATION ATTACK IN A DATA STORAGE DEVICE

SUMMARY

Various embodiments of the present disclosure are generally directed to a data storage device configured to defend against a side-channel information attack, such as a differential power analysis (DPA) attack.

In some embodiments, a programmable processor executes programming in a memory to perform a cryptographic function upon user data associated with a host command received from a host device. The cryptographic function involves multiple logical computations to arrive at an output value responsive to an input value over a time interval.

During the time interval, the programmable processor is repetitively interrupted by a plurality of interrupt calls respectively selected responsive to a first series of random numbers and resumes operation by a corresponding plurality of function return calls respectively selected responsive to a second series of random numbers. Each of the interrupt calls causes the programmable processor to temporarily suspend the multiple logical computations and perform at least one non-cryptographic function.

These and other features which characterize various embodiments of the present disclosure can be understood in view of the following detailed discussion and the accompanying drawings.

DETAILED DESCRIPTION

Figure 1:
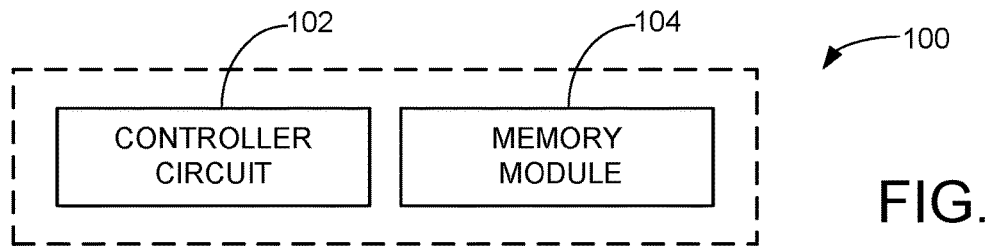
FIG. 1 is a functional block representation of a data storage system which operates in accordance with various embodiments of the present disclosure.

The present application is generally directed to data management in a data storage device, and more particularly to a method and apparatus for defending against a side-channel attack upon the data storage device, including but not limited to a differential power analysis (DPA) attack.

Data security schemes are used to reduce or eliminate unwanted access to data by unauthorized users of digital data storage systems. Data security schemes can employ a variety of security techniques in an effort to protect data. Some data security schemes employ cryptographic processes whereby data are processed, or encrypted, using a selected cryptographic algorithm to encode data in such a way that the underlying data cannot be easily recovered by an attacker. A wide variety of cryptographic functions are known in the art.

Cryptographic systems are generally operable to protect the underlying data from discovery. Even so, so-called side-channel attacks are often used by motivated attackers to glean side channels, or separate information streams, from a system that can ultimately reveal important information about the system, up to and including decoding of the data protected by the cryptographic algorithm. Side-channel attacks can take a variety of forms.

One common example of a side-channel attack involves monitoring a video channel of compressed data from a video source over time. If a camera or other data collection device captures video frames of a particular viewpoint and compresses the video data prior to transmission, the monitoring of a video stream of such data can indicate the presence (or absence) of a significant change in the viewpoint accessed by the camera. This is based on the recognition that highly compressed video data schemes tend to transmit successive frames of data with only the differences that were detected from one frame to the next.

If no significant changes have been detected in the field of view, the amount of transmitted data (and correspondingly, the amount of power or data packet size) should remain at a relatively low and constant value. On the other hand, a sudden increase in the amount of data transmitted would tend to indicate a significant change in the field of view has taken place, even if the underlying content of the visual content remained encrypted and undiscoverable.

Another well-known side-channel attack is sometimes referred to as a differential power analysis (DPA) attack. In a DPA context, an attacking party monitors differences in power consumption by an integrated circuit (IC) configured to carry out cryptographic functions. By comparing the power consumed by the IC in response to different input values, over time the attacker may be able to correlate certain inputs to different power consumption outputs. Given enough time, the attacker may be able to discern, from the information leaking from this side-channel path, the underlying cryptographic function that is being employed to encrypt the data, various encryption keys that are being used, and so on. Even if the underlying data cannot be retrieved, DPA attacks can still provide valuable information to an attacker regarding the construction and operation of the system.

Accordingly, various embodiments of the present disclosure are generally directed to a method and apparatus for configuring a data storage device to defeat or otherwise inhibit the effectiveness of a side-channel informational attack carried out upon a data storage device, including but not limited to a differential power analysis (DPA) attack.

As explained below, some embodiments generally involve using programming in a memory executed by a programmable processor to perform a cryptographic function involving multiple logical computations to arrive at an output value responsive to an input value over a time interval.

The cryptographic function is periodically interrupted over this time interval. The timing of these interrupts is based on a first series of random numbers. The duration of each of these interrupts is determined by a second series of random numbers. During each interrupted state, the processor executes one or more non-cryptographic functions (e.g., functions not related to the resolution of the cryptographic function). This disrupts the starting and ending points of the cryptographic function, as well as the power consumed by the processor during the execution of the cryptographic function, thereby increasing the difficulty of discerning the underlying cryptographic function during a side-channel attack.

These and other features and advantages of various embodiments can be understood beginning with a review of FIG. 1 which provides a generalized functional block diagram of a data storage device 100. The data storage device 100 includes a controller circuit 102 and a memory module 104. The controller circuit 102 is a hardware-based or programmable processor that provides top level control of the device 100. The memory module 104 comprises non-volatile memory such as but not limited to rotatable memory and/or solid-state memory.

The data storage device 100 can take any number of forms including a hard disc drive (HDD), a solid-state drive (SSD), a hybrid drive, an optical drive, a thumb drive, a memory card, integrated memory within an electronic device such as a computer, tablet, smart phone, appliance, work station, server, etc. The controller functionality can be incorporated directly into the memory module as desired.

Figure 2:
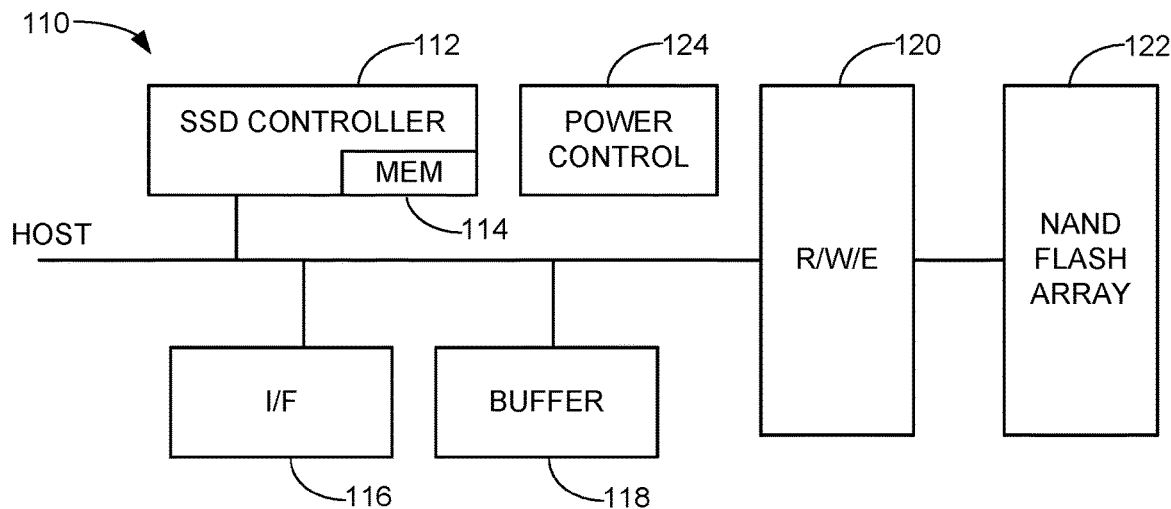
FIG. 2 shows a data storage device as in FIG. 1 configured as a solid state drive (SSD) with solid-state non-volatile NAND flash memory cells to store data in accordance with some embodiments.

FIG. 2 depicts aspects of a data storage device 110 generally similar to the data storage device 100 of FIG. 1. The device 110 is characterized as a solid state drive (SSD), although this is merely for purposes of illustration and is not limiting.

An SSD controller 112 generally corresponds to the controller circuit 102 of FIG. 1 and may be realized as a hardware circuit and/or a programmable processor with associated programming stored in local SSD controller memory (MEM) 114. An interface (I/F) circuit 116 coordinates transfers of commands and data between the SSD 110 and a host device. A buffer memory 118 may constitute volatile local buffer memory such as DRAM and/or SRAM to temporarily store user data during data transfer operations.

A read/write/erase (R/W/E) circuit 120 has the requisite functionality to carry out read, write (programming) and erasure functions upon a NAND flash memory array 122. The R/W/E circuit 120 and NAND flash memory array 124 may be incorporated in the memory module 104 of FIG. 1. The memory array 122 may include two dimensional (2D) or three dimensional (3D) NAND flash memory cells. The memory array 122 may further comprise individual flash memory cells configured as single level cells (SLCs), multi-level cells (MLCs), three-level cells (TLCs), etc.

A power control circuit block is denoted at 124. The power control circuit block 124 is operative to supply appropriate rail voltages (e.g., 3.3V, etc.) to the various circuits of the SSD 110 during powered operation. The power control circuit block 124 may receive input power from an external source, such as through the host interface, or may operate to convert input power from a locally supplied source such as battery power, an external AC power source, etc.

Figure 3:
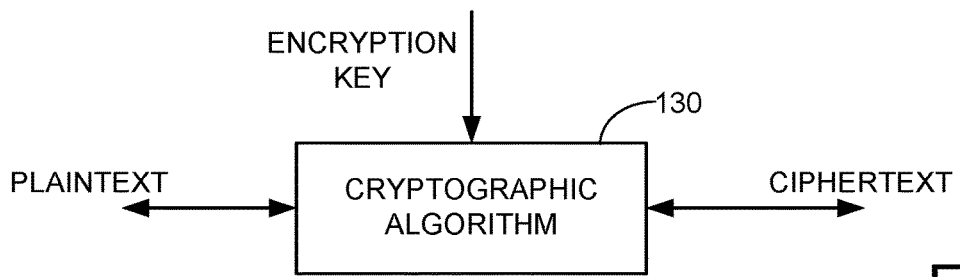
FIG. 3 shows a cryptographic algorithm block configured to carry out a cryptographic function upon input plaintext to form output cyphertext in some embodiments.

FIG. 3 shows a cryptographic algorithm block 130 which forms a portion of the SSD 110, such as but not limited to the SSD controller 112. The block 130 generally operates to transform input data (e.g., plaintext), into output data (e.g., ciphertext). This transformation is carried out using a selected cryptographic transform in accordance with one or more input parameters, such as an encryption key. Other input parameters can be used such as seed values, counter values, data addresses, etc. The process is symmetric so that the originally encrypted data (e.g., converted from plaintext to ciphertext) can be subsequently decrypted (e.g., converted from ciphertext to plaintext). While these processes are respectively referred to as encryption and decryption, as used herein the term encryption will cover both for simplicity.

It is contemplated that input user data supplied by the host device may be subjected to one or more levels of encryption to provide encrypted data that are stored by the NAND flash memory 122. The plaintext data represented in FIG. 3 may be in the form of unencrypted data, or may be data that have been previously encrypted by an upstream encryption process. Generally, a cryptographic function as defined herein is a function that is configured to increase the entropy of an input set of data toward the purpose of enhancing data security.

Substantially any cryptographic function can be used by the block 130 to transform the input data (e.g., plaintext or ciphertext) to provide the output data (e.g., ciphertext or plaintext), including but not limited to AES algorithms, hash functions, public/private key encryption algorithms, cipher block chaining (CBC) encryption algorithms, XTS mode (XOR/Encrypt/XOR based encryption with ciphertext stealing algorithms, etc.

Figure 4:
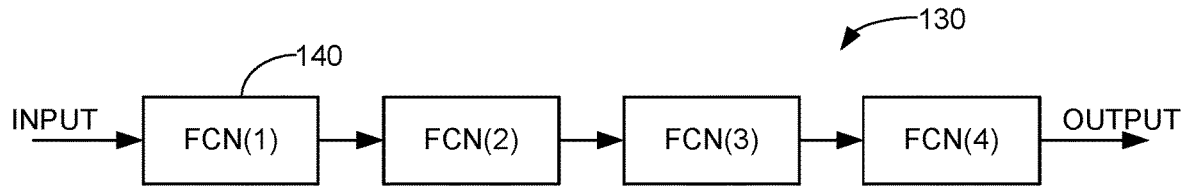
FIG. 4 shows a sequence of cryptographic functions that may be carried out in succession to effect the cryptographic algorithm of FIG. 3.

FIG. 4 shows a simplified functional block representation of the operation of the cryptographic algorithm block 130 of FIG. 3, broken up into a sequence of individual function blocks 140 that represent a series of combinatorial functions (FCN(1) to FCN(4)) that are successively carried out to perform the overall function of block 130. It will be appreciated that the specific number and type of functions will depend upon the form of the underlying cryptographic algorithm of block 130. Nevertheless, from FIG. 4 it can be seen that, for a given cryptographic algorithm, there will be a defined sequence of operations (e.g., addition, multiplication, data shifts, etc.) that are sequentially employed to generate the output ciphertext irrespective of the value of the input plaintext.

This functional arrangement of the operation of block 130 is necessary to ensure that, whatever sequence of transformations have been applied to a given set of input data, such operations are both repeatable and reversible. A cryptographic function needs to be repeatable in such a way that, for a given input value (plaintext), the same output value (ciphertext) is produced each time, or is otherwise obtainable from the output value. A cryptographic function needs to be reversible in such a way that, for a given set of encrypted ciphertext, the originally presented input data can be extracted and returned.

It follows that substantially all cryptographic algorithms may be susceptible to one or more types of side-channel attacks to detect information that leaks from the system. This is true even if steps are taken to protect the particular sequence carried out by the cryptographic algorithm, as well as the various inputs (e.g., encryption keys, seed values, etc.). Of particular interest to the present discussion are differential power analysis (DPA) attacks, which can be used to disclose important information to an attacker which, in some cases, may enable the attacker to not only discern the type of encryption used, but can also reveal particular state values as well such as the individual encryption keys, seed values, etc. that were used in the encryption process. The various techniques disclosed herein, however, are suitable to protect against other forms of side-channel attacks as well.

Figure 5:
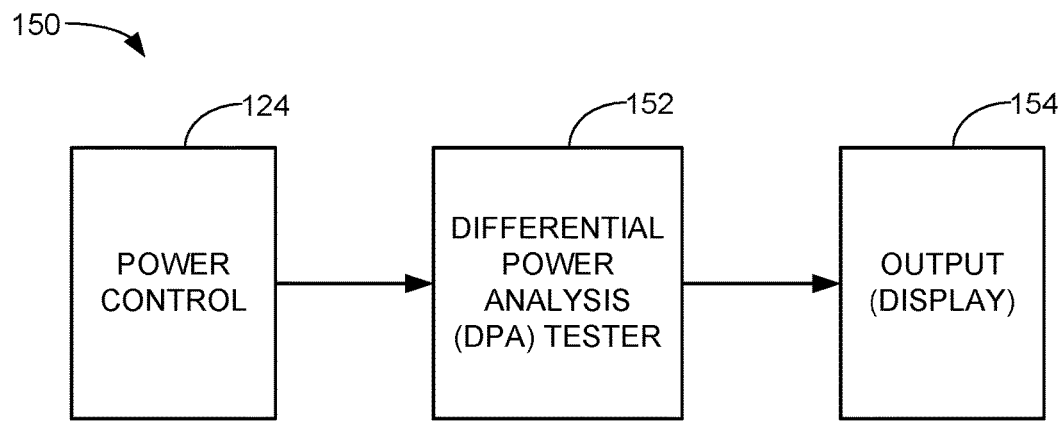
FIG. 5 is a functional block diagram of a system configured to carry out a differential power analysis (DPA) attack upon the data storage device of FIG. 2.

FIG. 5 shows an evaluation system 150 used by an attacker to obtain information regarding the cryptographic algorithm utilized by block 130 in FIG. 3. It is presumed that the attacker has obtained physical custody and control of the SSD 110 and can access various circuits of the device, including the power control circuit block 124 of FIG. 2.

A differential power analysis (DPA) tester device 152 accesses the power control circuit block to observe the power drawn by the SSD 110 or individual circuits thereof (e.g., the SSD controller 112) during operation. In at least some cases, the tester device 152 operates as particular inputs are supplied to the cryptographic algorithm block 130. Even if the tester 152 merely observes operation of the device 110 without being able to expressly enforce certain inputs, valuable information can still be collected over time with regard to the operation of the circuit. This output information can be collected by an output device 154, which may include a visual display feature (e.g., a computer monitor, etc.).

Figure 6:
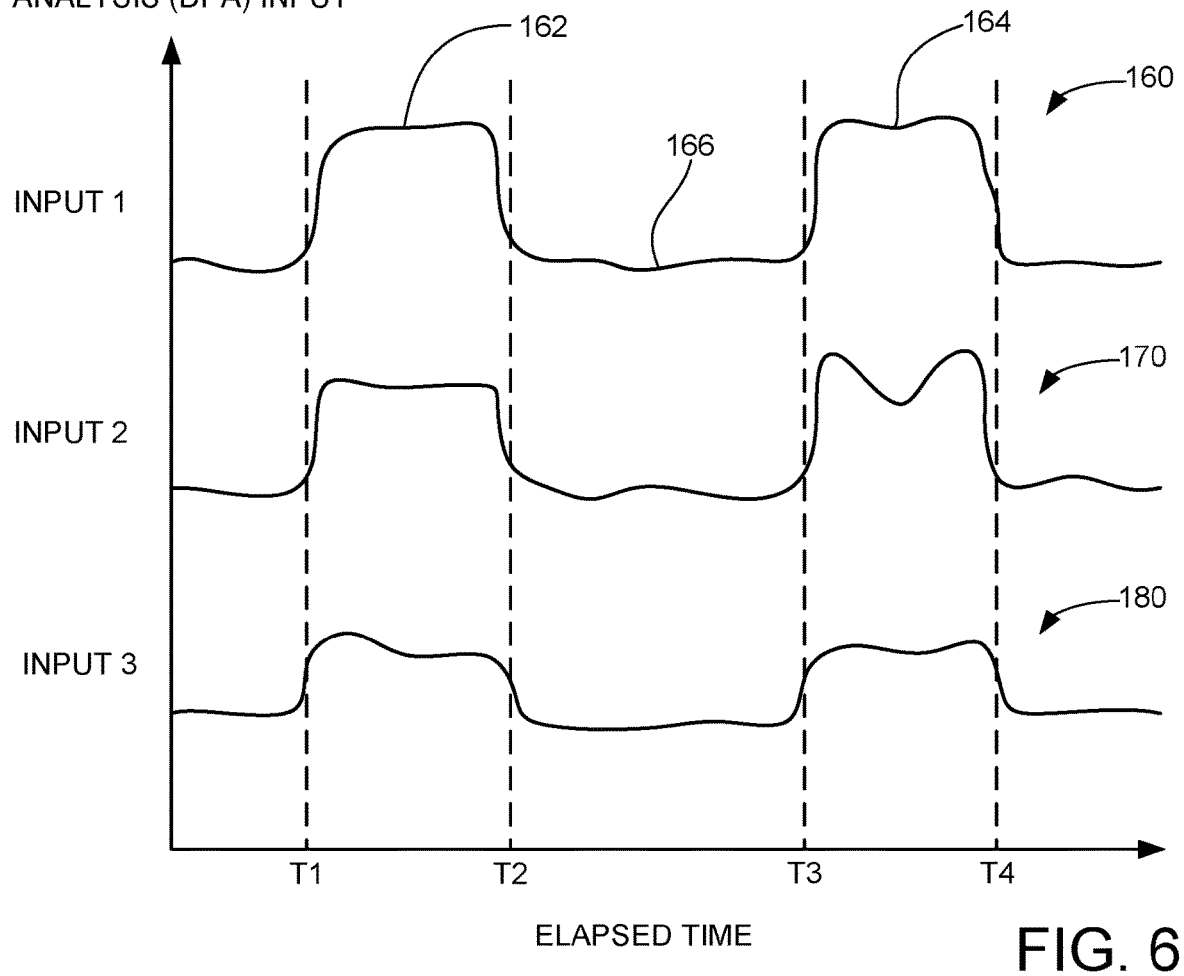
FIG. 6 is a graphical representation of exemplary data that may be recovered using the DPA attack equipment of FIG. 5 in some embodiments.

FIG. 6 is a simplified DPA analysis diagram showing various DPA response curves 160, 170 and 180 that are obtained by the system 150 of FIG. 5. It will be appreciated that other forms of DPA data may be recovered, and that the waveforms are highly simplified (e.g., filtered) to facilitate the present discussion. Each of the respective curves 160, 170 and 180 capture power levels drawn by a selected circuit (e.g., the SSD controller 112) over a selected period of time for different inputs. It is contemplated that the waveforms show operation of the circuit to carry out the cryptographic algorithm of block 130 of FIG. 3.

As shown by the respective curves, there are periods of high power consumption, such as depicted by pulses 162 and 164 in curve 160, and periods of low power consumption, such as depicted by region 166 in curve 160. Curve 170 and 180 have similar features although of different magnitudes. Each of these respective areas roughly correlate in time with different starting and ending periods indicated by time indicies T1-T4.

Given sufficient time, resolution and input variability, a motivated attacking party may be able to discern, from these and similar waveforms, the underlying processing carried out by the circuit. For example, certain types of operations, such as multiplication, involving logical 1s may require more current draw than the same operations involving logical 0s. Even if the attacking party is not able to fully "break" the encryption code in use, valuable information can be gleaned from the ability to correlate the circuit response based on different inputs.

Figure 7:
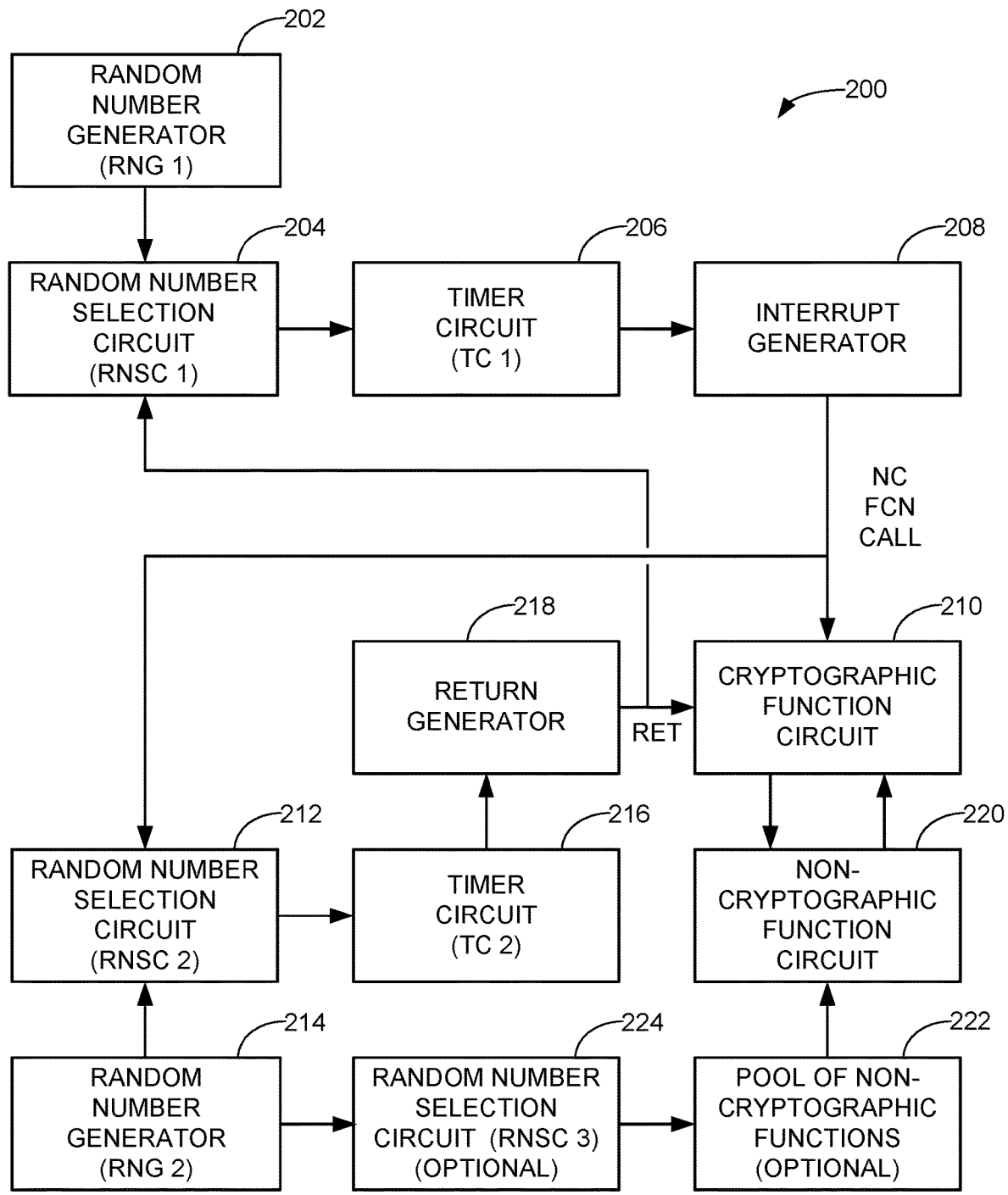
FIG. 7 is a functional block diagram of operational circuits of the data storage device of FIG. 2 configured in accordance with some embodiments to defeat the DPA attack equipment of FIG. 5 in some embodiments.

Accordingly, FIG. 7 shows a defensive circuit 200 of the SSD 110 useful in defeating side-channel attacks and analyses as described by FIGS. 5 and 6. The circuit 200 may represent programming utilized by the SSD controller 112, or may form some other aspect of the SSD 110. It is contemplated that the various elements are implemented via one or more programmable processors utilizing associated programming instructions in memory, but the circuit 200 can additionally or alternatively be implemented using hardware circuitry as desired. The circuit 200 is initiated during each cryptographic processing operation carried out by the cryptographic algorithm block 130 of FIG. 3 to encrypt or decrypt user data, as well as during other suitable times of the operation of block 130.

To explain the operation of the circuit 200, reference is initially made to a first random number generator (RNG 1) 202. The RNG 1 circuit 202 can take a variety of forms, including a table of previously generated random numbers, an entropy source and entropy extraction circuit, a cryptographic function, a ring oscillator circuit, etc. Generally, the RNG 1 circuit 202 is configured to output random or pseudo-random numbers over a selected range that approach truly random numbers.

The random numbers are contemplated as comprising multi-bit random values which are in turn selected, as required, by a first random number selection circuit (RNSC 1) 204. It is contemplated that the RNSC 1 circuit 204 will select a different random number each time the circuit 204 operates. In some cases, predetermined scripts of random numbers may be selected, so long as sufficient entropy is present to not enable the protection, as described below, to be detected, predicted, compensated and defeated.

Each selected random number is loaded to a first timer circuit (TC 1) 206, which initiates a count to mark a selected time interval having a duration corresponding to the selected random number. In some cases, the TC 1 circuit 206 may be a countdown timer so that the muti-bit random number initializes the timer, which proceeds to count down to 0 or some other final value at a suitable clock rate. Other forms of timer circuit can be used, so long as the circuit initiates a variable elapsed amount of time corresponding to the input selected random number.

At the conclusion of the time interval, the TC 1 circuit 206 provides an input to an interrupt generator circuit 208, which in turn sends an interrupt to a cryptographic function circuit 210. It is contemplated that the cryptographic function circuit 210 corresponds to the cryptographic algorithm block 130 and is carrying out, but has not yet completed, the execution of a selected cryptographic function upon input (plaintext) data when the interrupt is reached. When the interrupt is reached, the processor temporarily stops further operation of the cryptographic function, and as required stores various state variables and other data values to enable the processor to resume where it left off once the interrupt condition has been completed.

The interrupt may be characterized as a non-cryptographic function call (NC FCN Call). A single signal or multiple signals may be issued to effect this outcome. As shown by FIG. 7, the interrupt signals a second random number selection circuit (RNSC 2) 212 to select a second random number from a second random number generator circuit (RNG 2) 214. In some cases, both of the random number generator circuits may be realized as a common circuit, or two separate sources of random numbers may be used as desired.

The RNSC 2 circuit 212 initiates a second timer circuit (TC 2) 216 to initiate a second time interval responsive to the input random number from the RNSC 2 circuit. As before, the TC 2 circuit 216 may be a countdown timer that measures an elapsed period of time corresponding to the magnitude of the second input random number. Once this second interval of time is completed, a signal is output by the TC 2 circuit 216 to a return generator 218, which provides a function return (RET) signal to the cryptographic function circuit 210. Receipt of the return signal causes the cryptographic function circuit 210 to resume execution of the selected cryptographic function.

During the second elapsed period of time during which the cryptographic function circuit 210 is in an interrupted state, in preferred embodiments the circuit does not sit idle, but rather, initiates and performs a so-called non-cryptographic function, as indicated by block 220. As used herein, the term "non-cryptographic function" refers to an operation that does not advance solution of the selected cryptographic function, but otherwise does involve some functional operation by block 210. One reason for this is to disguise the power requirements associated with the selected cryptographic function; for example, having the circuit 220 merely sit idly may allow a motivated attacker to identify and discount any drops in power utilization during the interrupt periods.

Accordingly, the non-cryptographic function carried out during the interrupt period may in fact be a separate cryptographic function such as an encryption function that relies on other data, the results of which are discarded at the end of the interrupt period (or used for another data set). Other functions may include multiplication operations, division operations, addition, or other logical operations on any available data values, including but not limited to the random numbers available from RNG 1 and RNG 2 202, 214. In still further embodiments, the non-cryptographic function may be the execution of a pending command or request associated with a different data set.

In some embodiments, the same non-cryptographic function is selected and executed during each interrupt period. In other embodiments, different functions with different power consumption profiles are available in a pool of such functions, as indicated by circuit block 222. These different functions may be selected as required including by a third random number selection circuit (RNSC 3) 224, which may receive another random number from the RNG 2 circuit 214 (or other source). In this way, a randomly selected non-cryptographic function may be selected for execution during each interrupt period.

Once the interrupt period is completed and the cryptographic function circuit 210 resumes the calculations involved in the execution of the selected cryptographic algorithm, the return signal operates as a selection signal to the RNSC 1 circuit 204 to select a new random number from the RNG 1 circuit 202 and to reinitialize the TC 1 circuit 206. In this way, the foregoing process of periodic interrupts and returns is continued a succession of times until the cryptographic function circuit 210 has completed the processing of the associated data.

Figure 8:
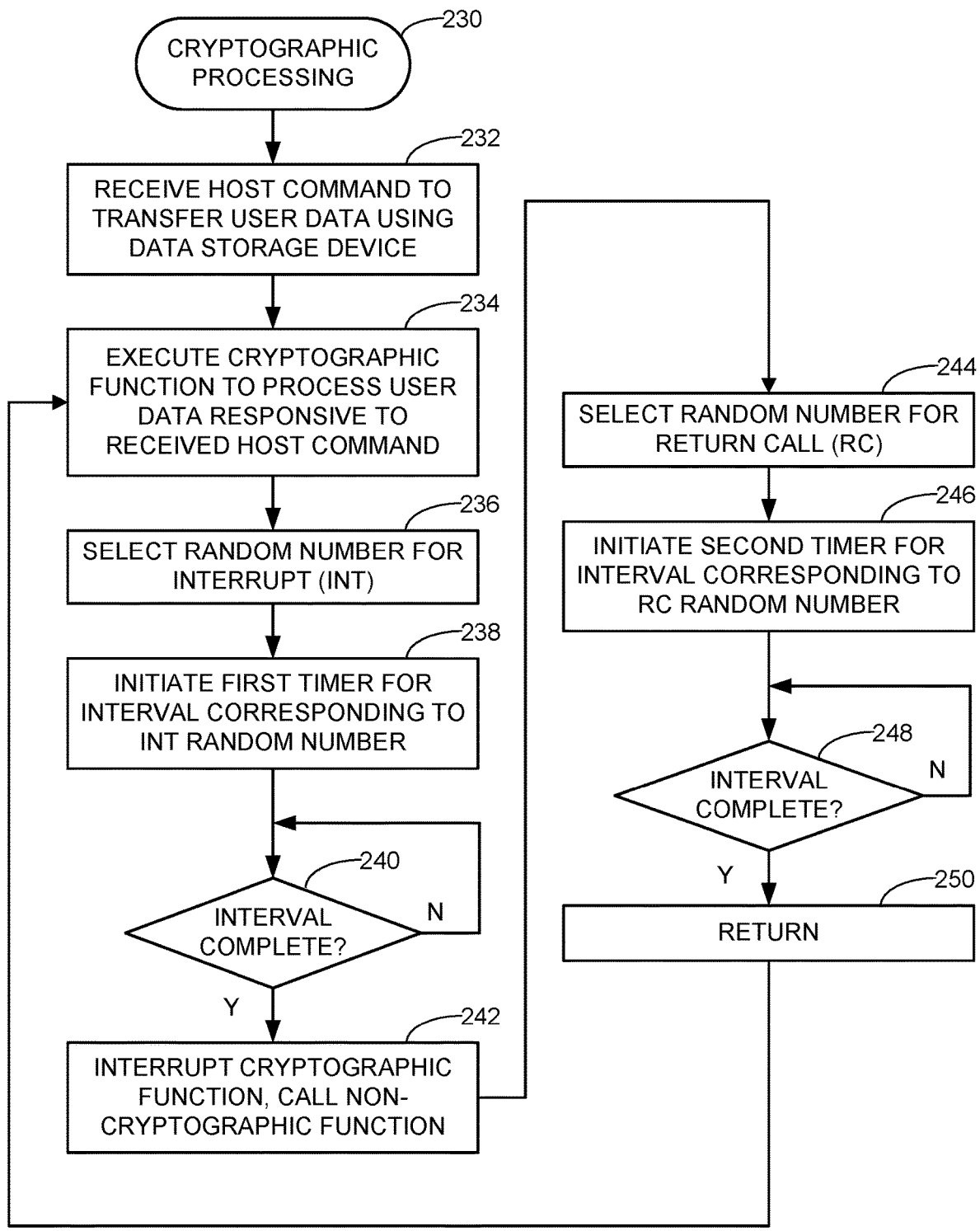
FIG. 8 is a flow chart for a cryptographic processing routine illustrative of steps carried out by various embodiments to protect against DPA attacks such as illustrated in FIGS. 5-6.

FIG. 8 shows a flow chart for a cryptographic processing routine 230 illustrative of the foregoing steps. As before, it is contemplated albeit not required that the various steps are carried out by a programmable processor of the SSD controller 112 (FIG. 2). The various steps are merely exemplary and may be appended, modified, carried out in a different order, etc.

At step 232, a host command is received to transfer user data between the host device and the SSD 110. The host command may take the form of a write command in which input user data received from the host device are to be encrypted prior to storage in the NAND flash memory array 122. Alternatively, the host command may take the form of a read command in which previously stored and encrypted user data are subsequently retrieved, decrypted, and returned to the host device. Other forms of host commands may be received as well that initiate operation of the encryption/decryption functions of the SSD.

At step 234, a selected cryptographic function is initiated upon selected user data associated with the host command. It is contemplated that the full execution of the cryptographic function will take place over a relatively short period of time. Nevertheless, the remaining steps shown in FIG. 8 will be carried out multiple times prior to the conclusion of the execution of the cryptographic function.

A first random number is selected at step 236 for an interrupt (INT) timer, such as the TC 1 circuit 206 of FIG. 7. The timer is initiated at step 238 to count out an elapsed time interval corresponding to the first random number. Decision step 240 indicates passage of this elapsed time interval.

At the conclusion of the elapsed time interval, the cryptographic function of step 234 is temporarily interrupted and a selected non-cryptographic function is called and initiated, step 242. A second random number is selected at step 244 for a return call (RC) interval, which is initiated at step 246 and monitored by step 248. Once completed, a function return is signaled at step 250 and the system resumes processing at step 234.

Figure 9:
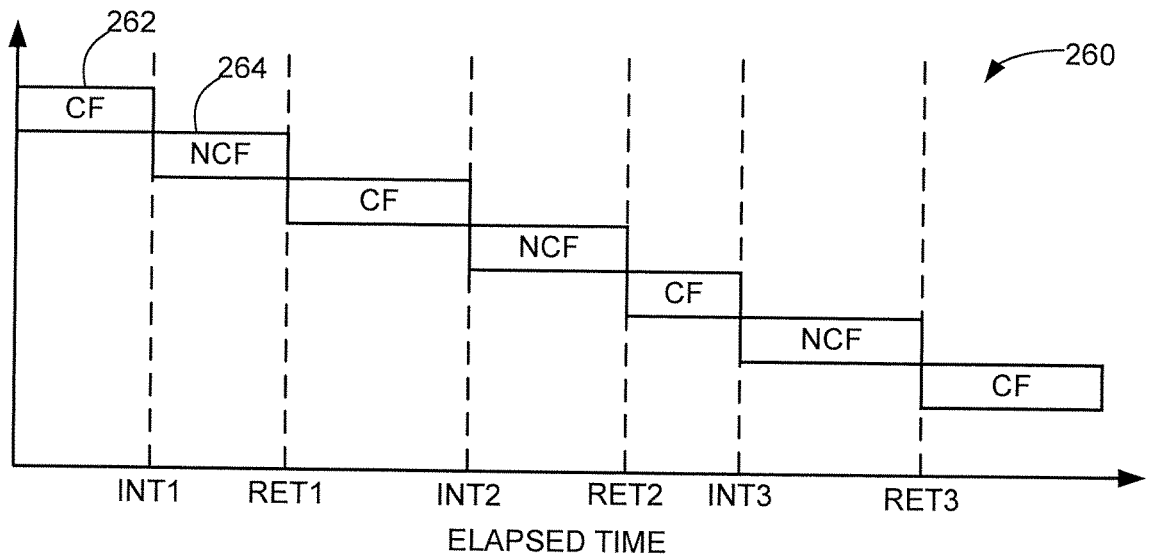
FIG. 9 is a timing diagram illustrative of a process flow obtained by the execution of the routine of FIG. 8.

A timing diagram is represented at 260 in FIG. 9 to illustrate operation of the routine 230 of FIG. 8. A sequence of cryptographic function (CF) blocks 262 and non-cryptographic function (NCF) blocks 264 are shown. Each is of variable length, providing different interrupt and return times during the cryptographic processing.

Figure 10:
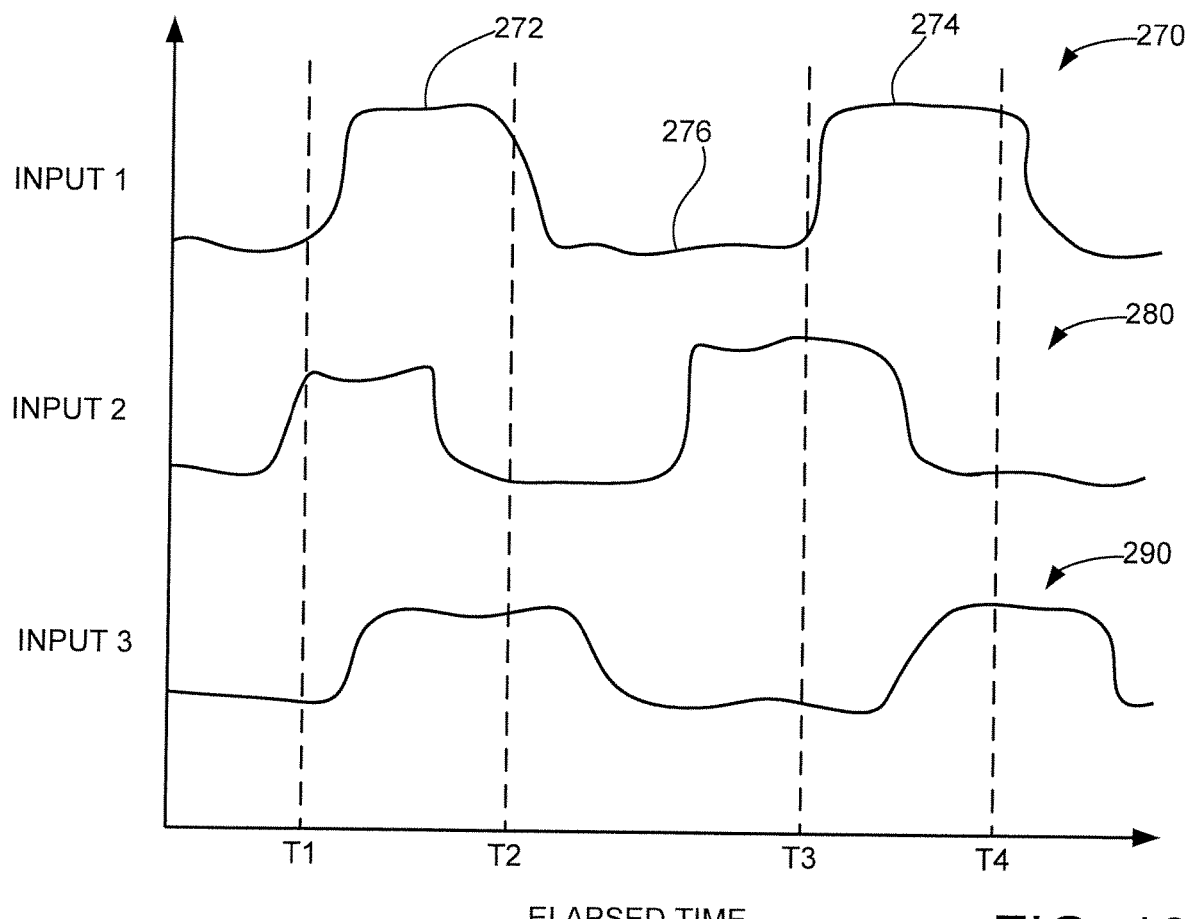
FIG. 10 is a graphical representation of exemplary data that may be recovered using the DPA attack equipment of FIG. 5 resulting from the cryptographic processing routine of FIG. 8.

FIG. 10 shows a corresponding sequence of DPA curves 270, 280 and 290 generally illustrative of DPA results that may be observed through the operation of the routine of FIG. 8. As before with the curves in FIG. 6, each curve includes pulses such as 272, 274 in curve 270 and troughs such as 276 in curve 270. The shapes and timing alignments are significantly different, however, as denoted by time indices T1-T4. These shifts in wave shape and timing reduce the ability of an attacking party from gleaning useful information in a side-channel attack.

While various embodiments have been directed to a data storage device such as an SSD, such is merely exemplary and is not limiting. The various embodiments can be readily adapted to substantially any environment in which cryptographic processing is applied to reduce leakage of side-channel information in a communication channel of a data storage device.

As used herein, the term "random numbers" and the like will be understood consistent with the foregoing discussion to describe "true" random numbers, numbers that are essentially indistinguishable from true random numbers, and pseudo-random numbers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method of reducing leakage of side-channel information in a communication channel of a data storage device, comprising:

receiving a host command from a host device to transfer user data between the host device and a main memory of the data storage device;

using programming in a memory executed by a programmable processor of the data storage device to perform a cryptographic function involving multiple logical computations to arrive at an output value responsive to an input value over a time interval from receipt of the input value to generation of the output value, the input value forming a portion of the user data associated with the host command, the programmable processor clocked at a constant clock rate over an entirety of the time interval; and during the time interval, repetitively interrupting the programmable processor during the multiple logical computations by a plurality of interrupt calls respectively selected responsive to a first series of random numbers and resuming operation of the programmable processor to continue the multiple logical computations by a corresponding plurality of function return calls respectively selected responsive to a different, second series of random numbers, each of the plurality of interrupt calls causing the programmable processor to temporarily suspend the multiple logical computations and perform at least one non-cryptographic function.

2. The method of claim 1, wherein each interrupt call of the plurality of interrupt calls occurs at a point in time responsive to a selected one of the first series of random numbers, and a duration of time between each interrupt call of the plurality of interrupt calls and the immediately successive function return call of the plurality of function return calls is determined responsive to a selected one of the second series of random numbers.

3. The method of claim 1, wherein the host command is a write command to transfer the user data from the host device to the main memory of the data storage device, wherein the cryptographic function comprises encrypting the user data using at least one encryption key to generate encrypted user data, and the method further comprises storing the encrypted user data in a selected location of the main memory of the data storage device.

4. The method of claim 1, wherein the host command is a read command to transfer the user data from the main memory of the data storage device to the host device, wherein the user data comprises encrypted user data previously encrypted using a selected encryption key, wherein the cryptographic function comprises decrypting the encrypted user data using the selected encryption key to generate unencrypted user data, and the method further comprises transferring the unencrypted user data to the host device.

5. The method of claim 1, further comprising initiating a first timer circuit of the data storage device responsive to a first selected random number from the first series of random numbers to denote a first elapsed time interval corresponding to the first selected random number, and interrupting the programmable processor responsive to a conclusion of the first elapsed time interval.

6. The method of claim 5, further comprising initiating a second timer circuit of the data storage device responsive to a second selected random number from the second series of random numbers and the conclusion of the first elapsed time interval to denote a second elapsed time interval corresponding to the second selected random number, and issuing a selected function return call responsive to a conclusion of the second elapsed time interval.

7. The method of claim 1, further comprising using a first random number generator circuit to generate the first series of random numbers and using a second random number generator circuit to generate the second series of random numbers.

8. The method of claim 1, further comprising using a combined random number generator circuit to generate the respective first and second series of random numbers.

9. The method of claim 1, wherein between each of the plurality of interruption calls and each of the corresponding plurality of function return calls a different non-cryptographic function is executed by the programmable processor.

10. The method of claim 9, wherein the different non-cryptographic functions executed by the programmable processor are each selected responsive to a different one of a third series of random numbers.

11. The method of claim 1, wherein the data storage device is a solid state drive (SSD), the programmable processor forms a portion of an SSD controller circuit, and the main memory is a NAND flash memory array.

12. A data storage device comprising:

a main memory configured to store user data supplied by a host device; and a controller circuit comprising a programmable processor having associated programming in a memory configured to, responsive to receipt of a host command from the host device to direct a transfer of selected user data between the host device and the main memory, perform a cryptographic function involving multiple logical computations to arrive at an output value responsive to an input value over a time interval from receipt of the input value to generation of the output value, the input value forming a portion of the selected user data associated with the host command, the controller circuit further configured to, during the time interval, repetitively interrupt the programmable processor during the multiple logical computations by a plurality of interrupt calls respectively selected responsive to a first series of random numbers and resuming operation of the programmable processor to continue the multiple logical computations by a corresponding plurality of function return calls respectively selected responsive to a different, second series of random numbers, each of the plurality of interrupt calls causing the programmable processor to temporarily suspend the multiple logical computations and perform at least one non-cryptographic function unrelated to the cryptographic function, the programmable processor clocked at a constant, selected clock rate over an entirety of the time interval during execution of the cryptographic function and the non-cryptographic function.

13. The data storage device of claim 12, wherein the controller circuit further comprises at least one random number generator circuit configured to generate the first and second series of random numbers, a first timer circuit configured to be initiated responsive to a first selected random number from the first series of random numbers to denote a first elapsed time interval corresponding to the first selected random number, and an interrupt generator circuit configured to interrupt the programmable processor responsive to a conclusion of the first elapsed time interval.

14. The data storage device of claim 13, wherein the controller circuit further comprises a second timer circuit configured to be initiated responsive to a second selected random number from the second series of random numbers and the conclusion of the first elapsed time interval to denote a second elapsed time interval corresponding to the second selected random number, and a function return call generator circuit configured to issue a selected function return call to the programmable processor responsive to a conclusion of the second elapsed time interval.

15. The data storage device of claim 12, wherein each interrupt call of the plurality of interrupt calls occurs at a point in time responsive to a selected one of the first series of random numbers, and a duration of time between each interrupt call of the plurality of interrupt calls and the immediately successive function return call of the plurality of function return calls is determined responsive to a selected one of the second series of random numbers.

16. The data storage device of claim 12, wherein the host command is a write command to transfer the user data from the host device to the main memory of the data storage device, wherein the cryptographic function comprises encrypting the user data using at least one encryption key to generate encrypted user data, and the controller circuit is further configured to direct storage of the encrypted user data in a selected location of the main memory of the data storage device.

17. The data storage device of claim 12, wherein the host command is a read command to transfer the user data from the main memory of the data storage device to the host device, wherein the user data comprises encrypted user data previously encrypted using a selected encryption key, wherein the cryptographic function comprises decrypting the encrypted user data using the selected encryption key to generate unencrypted user data, and the controller circuit is further configured to transfer the unencrypted user data to a buffer memory of the data storage device pending transfer, across a host interface, to the host device.

18. The data storage device of claim 12, wherein between each of the plurality of interruption calls and each of the corresponding plurality of function return calls a different non-cryptographic function is executed by the programmable processor.

19. The data storage device of claim 18, wherein the different non-cryptographic functions executed by the programmable processor are each selected by the controller circuit responsive to a different one of a third series of random numbers.

20. The data storage device of claim 12, characterized as solid state drive (SSD), wherein the main memory is a NAND flash memory array.

* * * * *